(12) United States Patent
Hsieh

(10) Patent No.: US 8,489,869 B2
(45) Date of Patent: Jul. 16, 2013

(54) ELECTRONIC DEVICE AND RELATED METHOD FOR ENHANCING CONVENIENCE OF A COMPUTER SYSTEM

(75) Inventor: Chih-Yuan Hsieh, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 1089 days.

(21) Appl. No.: 12/175,457

(22) Filed: Jul. 18, 2008

(65) Prior Publication Data
US 2009/0094448 A1 Apr. 9, 2009

(30) Foreign Application Priority Data
Oct. 5, 2007 (TW) .............................. 96137524 A

(51) Int. Cl.
G06F 15/177 (2006.01)
G05B 19/00 (2006.01)

(52) U.S. Cl.
USPC ............................................ 713/2; 340/5.82

(58) Field of Classification Search
USPC ........................................................ 726/36, 1
See application file for complete search history.

(56) References Cited

U.S. PATENT DOCUMENTS 6,658,562 B1 * 12/2003 Bonomo et al. ................. 713/1
2002/0095608 A1 * 7/2002 Slevin ........................... 713/202
2005/0204156 A1 * 9/2005 Chang ........................... 713/200

OTHER PUBLICATIONS

Dave Cook, 2005, Windows XP: Working With User Accounts.*

* cited by examiner

Primary Examiner — Saleh Najjar
Assistant Examiner — Shu Chun Gao
(74) Attorney, Agent, or Firm — Winston Hsu; Scott Margo

(57) ABSTRACT

An electronic device and related method for enhancing convenience of a computer system includes a memory unit for storing a plurality of boot-up configuration files and a plurality of human characteristic signals corresponding to the plurality of boot-up configuration files, a human characteristic reception unit for receiving a human characteristic, and a logic unit coupled to a power switch, the memory unit, and the human characteristic reception unit, for comparing the human characteristic received by the human characteristic reception unit and the plurality of human characteristic signals stored in the memory unit for generating a comparison result when the power switch is turned on, and performing a boot-up procedure to turn on the computer system according to the comparison result.

16 Claims, 3 Drawing Sheets

| Fingerprint signal<br>Hardware configuration | Fingerprint A | Fingerprint B | Fingerprint C |
|---|---|---|---|
| Speaker | OFF | OFF | ON |
| Wireless network | OFF | ON | ON |
| Bluetooth | OFF | ON | OFF |
| External interface | ON | ON | OFF |

FIG. 2

ELECTRONIC DEVICE AND RELATED METHOD FOR ENHANCING CONVENIENCE OF A COMPUTER SYSTEM

BACKGROUND OF THE INVENTION

1. Field of the Invention

The present invention is related to an electronic device and related method for enhancing convenience of a computer system, and more particularly, to an electronic device and related method capable of taking a specific boot-up configuration file for a boot-up procedure of the computer system according to human characteristics.

2. Description of the Prior Art

A laptop (i.e., a notebook computer) has several advantages, such as a small-sized volume, lightweight, and convenient for carrying due to its portability. These properties allow a user to work in any location. A small, thin, and light notebook computer provides the user with powerful computation abilities and document or multimedia processing functions anywhere and anytime, and thereby the work location of the user is not limited. However, in some cases, the user is not allowed to use some functions of the notebook computer to avoid affecting other people or causing unsafe issues.

For example, in a library, a cramming-book center, a meeting, etc., the user is requested to be quiet for avoiding affecting other people, so that the user is not allowed to use an audio output function of the notebook computer. In such case, if the user wants to use the notebook computer to surf Internet or perform document processing, the user must turn off speakers of the notebook computer or switch to mute for avoiding affecting other people. However, in the prior art, the user can turn off the speakers or switch to mute through an operating system of the notebook computer. In general, when the notebook computer enters the operating system, the notebook computer generates an alarm sound, which may affect other people in the library, and thus embarrass the user.

Besides, when the user takes airplane, the user is not allowed to use wireless communication functions of the notebook computer, including functions of wireless network access, Bluetooth, global positioning system, etc., in order to maintain flight safety. In such case, if the user wants to perform document processing with the notebook computer, the user must turn off the wireless communication functions. However, in the prior art, the user can turn off the wireless communication functions through the operating system or a basic input output system (BIOS) of the notebook computer, which is not familiar to the user, and is not convenient. In other worlds, before the user turns off the wireless communication functions through the operating system and BIOS of the notebook computer, the wireless communication functions keep working, and may keep detecting wireless network, which may cause unsafety in flight.

In short, since the prior art notebook computer switches specific functions through the operating system or BIOS, the notebook computer may affect and disturb other people, and cause unsafety.

SUMMARY OF THE INVENTION

It is therefore a primary objective of the claim invention to provide an electronic device for enhancing convenience of a computer system.

The present invention discloses an electronic device for enhancing convenience of a computer system, which comprises a memory unit for storing a plurality of boot-up configuration files and a plurality of human characteristic signals corresponding to the plurality of boot-up configuration files, a human characteristic reception unit for receiving a human characteristic, and a logic unit coupled to a power switch, the memory unit, and the human characteristic reception unit, for comparing the human characteristic received by the human characteristic reception unit and the plurality of human characteristic signals stored in the memory unit for generating a comparison result when the power switch is turned on, and performing a boot-up procedure to turn on the computer system according to the comparison result.

The present invention further discloses a method for enhancing convenience of a computer system, which comprises storing a plurality of boot-up configuration files and a plurality of human characteristic signals corresponding to the plurality of boot-up configuration files, receiving a human characteristic when a power switch of the computer system is turned on, comparing the human characteristic and the plurality of human characteristic signals for generating a comparison result when the power switch is turned on, and performing a boot-up procedure for turning on the computer system according to the comparison result.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates a schematic diagram of a boot-up table of the electronic device shown in FIG. 1.

DETAILED DESCRIPTION

Figure 1:
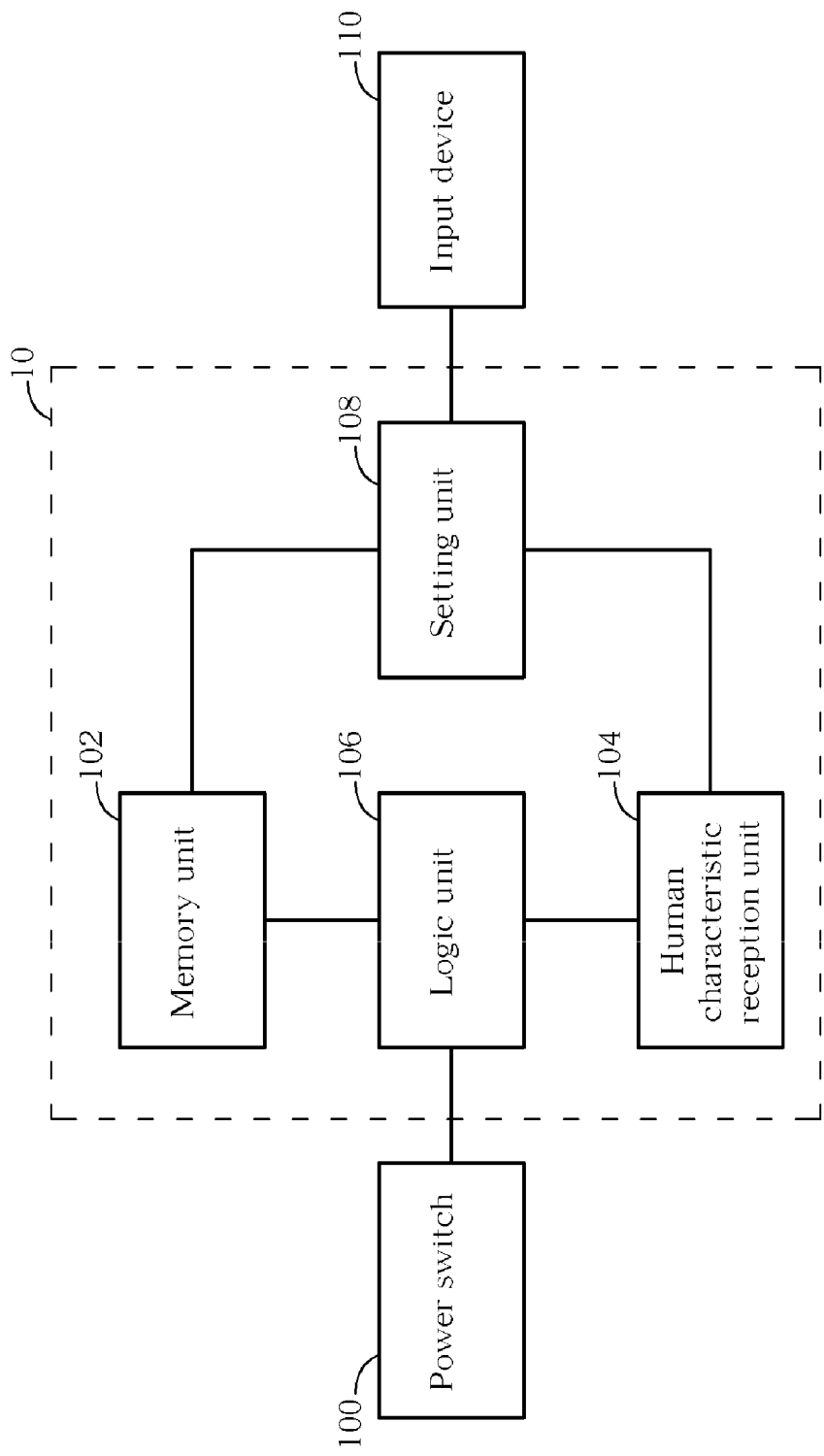
FIG. 1 illustrates a block diagram of an electronic device for enhancing convenience of a computer system according to an embodiment of the present invention.

Please refer to FIG. 1. FIG. 1 illustrates a block diagram of an electronic device 10 for enhancing convenience of a computer system according to an embodiment of the present invention. The computer system can be any computation system having a central processing unit, such as desktop or notebook computers, etc. The electronic device 10 is coupled to a power switch 100 and an input device 110 of the computer system. The input device 110 can be a wired or wireless input device, such as a mouse, a keyboard, etc. The electronic device 10 comprises a memory unit 102, a human characteristic reception unit 104, a logic unit 106, and a setting unit 108. The memory unit 102 is installed or externally connected to BIOS of the computer system for storing a plurality of boot-up configuration files and a plurality of human characteristic signals. Each boot-up configuration file is corresponding to a human characteristic signal. The human characteristic reception unit 104 can be a human characteristic recognizer for reading and recognizing human characteristics, such as fingerprints, irises, and palm prints, etc. The logic unit 106 can be installed or externally connected to BIOS of the computer system, and is coupled to the power switch 100, the memory unit 102, and the human characteristic reception unit 104. When the power switch 100 is turned on, the logic unit 106 compares a human characteristic received by the human characteristic reception unit 104 with the plurality of human characteristic signals stored in the memory unit 102, generates a comparison result, and performs a boot-up procedure accordingly to turn on the computer system. The setting unit 108 is coupled to the input device 110, the memory unit 102, and the human characteristic reception unit 104, and utilized for obtaining the plurality of human characteristic signals through the human characteristic reception unit 104, accomplishing the plurality of boot-up configuration files through the input device 110, and finally storing the plurality of human characteristic signals and the plurality of boot-up configuration files in the memory unit 102.

Therefore, using the electronic device 10, the user can preset multiple boot-up configuration files and corresponding human characteristic signals through the setting unit 108, and store the setting result in the memory unit 102. For example, the user can set a forefinger print corresponding to a flight mode and a middle finger print corresponding to a mute mode. Then, when the user turns on the computer system through the power switch 100, the human characteristic reception unit 104 accesses a human characteristic of the user, and the logic unit 106 determines if the human characteristic received by the human characteristic reception unit 104 conforms to a human characteristic signal stored in the memory unit 102. If the human characteristic conforms to a human characteristic signal, the logic unit 106 takes a boot-up configuration file corresponding to the human characteristic signal for the boot-up procedure of the computer system. If the human characteristic does not conform to any human characteristic signal, the logic unit 106 takes a normal boot-up configuration file for the boot-up procedure or prohibits booting the computer system. Therefore, the electronic device 10 can choose appropriate boot-up configuration files according to different human characteristics for avoiding affecting other people or causing unsafety.

For example, please refer to FIG. 2. FIG. 2 illustrates a schematic diagram of a boot-up table 20 utilized for the electronic device 10. The user can generate the boot-up table 20 through the setting unit 108 and store the boot-up table 20 in the memory unit 102. In the boot-up table 20, "OFF" represents disable and "ON" represents available. Besides, "Fingerprint A" represents a fingerprint signal corresponding to the forefinger, and the corresponding hardware configuration is utilized for the flight mode. "Fingerprint B" represents a fingerprint signal corresponding to the middle finger, and the corresponding hardware configuration is corresponding to the mute mode. "Fingerprint C" represents a fingerprint signal corresponding to the ring finger, and the corresponding hardware configuration is utilized for a public mode.

Therefore, through the boot-up table 20, when the user takes airplane and wants to use the computer system, the user can turn on the power switch 100, and input a human characteristic signal corresponding to the user's forefinger print through the human characteristic reception unit 104, so as to take the boot-up configuration file corresponding to the "Fingerprint A" for the boot-up procedure, to disable the wireless communication functions. When the user is in a library, a cramming-book center or a meeting, the user can take the boot-up configuration file corresponding to "Fingerprint B" for the boot-up procedure through the middle fingerprint, to turn off audio functions. When the computer system is in public (e.g. demonstrator), the user can take the boot-up configuration file corresponding to "Fingerprint C" for the boot-up procedure through the ring fingerprint, to turn off functions of external interfaces, e.g. USB, 1394, etc.

Note that, the boot-up table 20 shown in FIG. 2 is an exemplary embodiment of the present invention. Those skilled in the art can set appropriate boot-up tables based on different requirements.

In the prior art, the user switches specific hardware through the operating system or BIOS of the notebook computer, which may affect other people, embarrass users, and may cause unsafety. In comparison, using the electronic device 10, the user can take a specific boot-up configuration file for the boot-up procedure of the computer system through the human characteristics, such as fingerprints, palm prints, etc., so as to turn on or off specific hardware before entering the operating system of the computer system. Therefore, the electronic device 10 can avoid affecting other people or causing unsafety, and thus enhance convenience.

Figure 3:
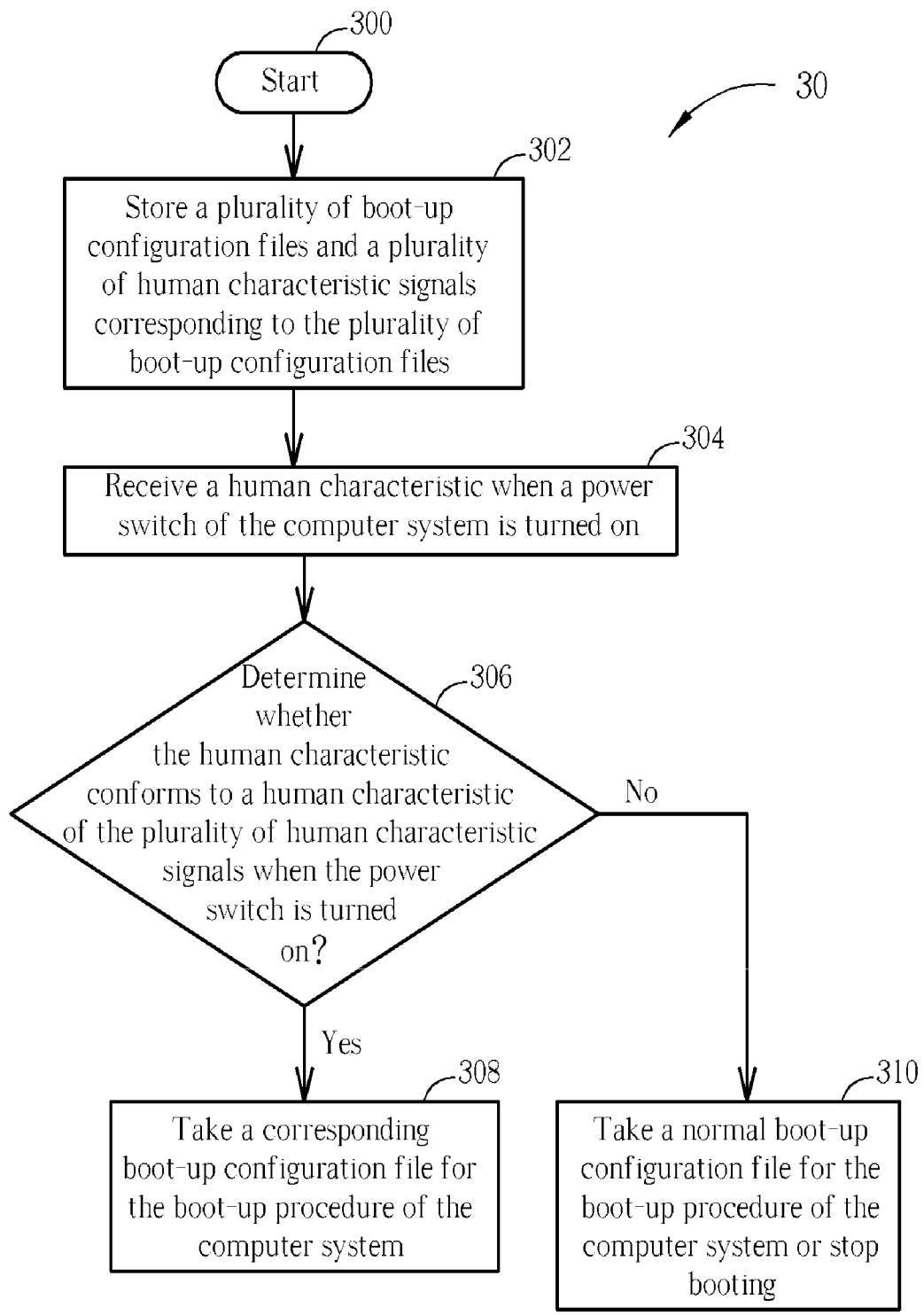
FIG. 3 illustrates a schematic diagram of a flow chart according to an embodiment of the present invention.

The operational principle of the electronic device 10 can be summarized in a flow chart 30, shown in FIG. 3. The flow chart 30 comprises:

Step 300: Start.

Step 302: Store a plurality of boot-up configuration files and a plurality of human characteristic signals corresponding to the plurality of boot-up configuration files.

Step 304: Receive a human characteristic when a power switch of the computer system is turned on.

Step 306: Determine whether the human characteristic conforms to a human characteristic of the plurality of human characteristic signals when the power switch is turned on. If true, go to step 308; otherwise, go to step 310.

Step 308: Take a corresponding boot-up configuration file for the boot-up procedure of the computer system.

Step 310: Take a normal boot-up configuration file for the boot-up procedure of the computer system or stop booting.

The flow chart 30 is utilized for illustrating the operations of the electronic device 10, and the detail description thereof can be referred to the above, and is not narrated here. Besides, the flow chart 30 can be realized by the BIOS of the computer system, firmware or software.

In summary, the user can take a specific boot-up configuration file for the boot-up procedure of the computer system through the human characteristics, such as fingerprints, palm prints, etc. As a result, before entering the operating system of the computer system, the user can switch specific hardware, so as to avoid affecting other people or cause unsafety, and thus enhancing utility convenience.

Those skilled in the art will readily observe that numerous modifications and alterations of the device and method may be made while retaining the teachings of the invention.

What is claimed is:

1. An electronic device for enhancing convenience of a computer system comprising:
   an input device;
   a memory unit for storing a plurality of boot-up configuration files and a plurality of human characteristic signals corresponding to the plurality of boot-up configuration files;
   a human characteristic reception unit for receiving a human characteristic; and
   a logic unit coupled to a power switch, the memory unit, and the human characteristic reception unit, for comparing the human characteristic received by the human characteristic reception unit and the plurality of human characteristic signals stored in the memory unit for generating a comparison result when the power switch is turned on, choosing a boot-up configuration file corresponding to a human characteristic signal of the plurality of human characteristic signals from the plurality of boot-up configuration files, and taking the boot-up configuration file for a boot-up procedure for turning on the computer system when the comparison result indicates that the human characteristic received from the human characteristic reception unit conforms to the human characteristic signal;

a setting unit coupled to the memory unit, the human characteristic reception unit, and the input device for obtaining the plurality of human characteristic signals through the human characteristic reception unit, obtaining the plurality of boot-up configuration files through the input device, and storing the plurality of human characteristic signals and the plurality of boot-up configuration files in the memory unit, so as to generate the plurality of the boot-up configuration files and the plurality of human characteristic signals.

2. The electronic device of claim 1, wherein the plurality of human characteristic signals stored in the memory unit are corresponding to a plurality of fingerprints.

3. The electronic device of claim 2, wherein the human characteristic reception unit is a fingerprint recognizer.

4. The electronic device of claim 1, wherein the logic unit uses a normal boot-up configuration file and takes the normal boot-up configuration file for the boot-up procedure for turning on the computer system when the comparison result indicates that the human characteristic received from the human characteristic reception unit does not conform to any human characteristic signal of the plurality of human characteristic signals.

5. The electronic device of claim 1, wherein the logic unit is further utilized for stopping the boot-up procedure when the comparison result indicates that the human characteristic received from the human characteristic reception unit does not conform to any human characteristic signal of the plurality of human characteristic signals.

6. The electronic device of claim 1, wherein the memory unit is installed in a basic input-output system of the computer system.

7. The electronic device of claim 1, wherein the logic unit is installed in a basic input-output system of the computer system.

8. The electronic device of claim 1, the computer system is a notebook computer.

9. An method for enhancing convenience of a computer system comprising:
generating a plurality of the boot-up configuration files and a plurality of human characteristic signals corresponding to the plurality of boot-up configuration files;
storing the plurality of boot-up configuration files and the plurality of human characteristic signals;
receiving a human characteristic when a power switch of the computer system is turned on; and
comparing the human characteristic and the plurality of human characteristic signals for generating a comparison result when the power switch is turned on, choosing a boot-up configuration file corresponding to a human characteristic signal of the plurality of human characteristic signals from the plurality of boot-up configuration files, and taking the boot-up configuration file for a boot-up procedure for turning on the computer system when the comparison result indicates that the received human characteristic conforms to the human characteristic signal.

10. The method of claim 9, wherein the plurality of human characteristic signals are corresponding to a plurality of fingerprints.

11. The method of claim 10, wherein the human characteristic is read from a fingerprint recognizer.

12. The method of claim 9 further comprising using a normal boot-up configuration file and taking the normal boot-up configuration file for the boot-up procedure for turning on the computer system when the comparison result indicates that the received human characteristic does not conform to any human characteristic signal of the plurality of human characteristic signals.

13. The method of claim 9 further comprising stopping performing the boot-up procedure when the comparison result indicates that the received human characteristic does not conform to any human characteristic signal of the plurality of human characteristic signals.

14. The method of claim 9, wherein storing the plurality of boot-up configuration files and the plurality of human characteristic signals is storing the plurality of boot-up configuration files and the plurality of human characteristic signals in a basic input-output system of the computer system.

15. The method of claim 9 realized in a basic input-output system of the computer system.

16. The method of claim 9, the computer system is a notebook computer.

* * * * *